United States Patent
MacLean (10) Patent No.: US 12,059,867 B2
(45) Date of Patent: Aug. 13, 2024

(54) SINGLE SHEAR JOINT FOR NODE-TO-NODE CONNECTIONS

(71) Applicant: Divergent Technologies, Inc., Los Angeles, CA (US)

(72) Inventor: Calvin Ray MacLean, Carson, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 26 days.

(21) Appl. No.: 17/665,445

(22) Filed: Feb. 4, 2022

(65) Prior Publication Data

US 2022/0153010 A1 May 19, 2022

Related U.S. Application Data (63) Continuation of application No. 15/924,133, filed on Mar. 16, 2018, now Pat. No. 11,267,236.

(51) Int. Cl.
  B32B 15/01 (2006.01)
  B22F 10/28 (2021.01)
  (Continued)

(52) U.S. Cl.
  CPC ............... B32B 15/01 (2013.01); B32B 7/12 (2013.01); B32B 37/1284 (2013.01);
  (Continued)

(58) Field of Classification Search
  CPC ............................ B32B 37/1284; B32B 7/12
  See application file for complete search history.

(56) References Cited

U.S. PATENT DOCUMENTS

| 1,541,601 A | * | 6/1925 | Tribe | F16L 17/04 |
| | | | | 277/614 |
| 4,223,895 A | * | 9/1980 | Roberts, Jr. | F16L 17/035 |
| | | | | 277/625 |

(Continued)

FOREIGN PATENT DOCUMENTS

| GB | 2355775 A * | 5/2001 | ........... B29C 65/342 |
| WO | 1996036455 A1 | 11/1996 | |

(Continued)

OTHER PUBLICATIONS

US 9,202,136 B2, 12/2015, Schmidt et al. (withdrawn)
US 9,809,265 B2, 11/2017, Kinjo (withdrawn)
US 10,449,880 B2, 10/2019, Mizobata et al. (withdrawn)

*Primary Examiner* — Jacob T Minskey
*Assistant Examiner* — Wayne K. Swier
(74) *Attorney, Agent, or Firm* — ARENTFOX SCHIFF LLP (57) ABSTRACT

One aspect is an apparatus including a first node including a first bonding surface and a second node including a second bonding surface. The apparatus includes a feature configured to accept an adhesive and an adhesive channel coupled to the feature configured to accept the adhesive. The apparatus includes a shear joint coupling the first node and the second node, the shear joint configured to receive the adhesive in an adhesive region formed by the first bonding surface and the second bonding surface, the adhesive for coupling the first bonding surface to the second bonding surface through the feature configured to accept the adhesive.

21 Claims, 8 Drawing Sheets

(51) Int. Cl.

| | | |
|---|---|---|
| *B22F 12/00* | (2021.01) | |
| *B22F 12/49* | (2021.01) | |
| *B22F 12/52* | (2021.01) | |
| *B32B 7/12* | (2006.01) | |
| *B32B 37/12* | (2006.01) | |
| *B33Y 10/00* | (2015.01) | |
| *B33Y 40/00* | (2020.01) | |

(52) U.S. Cl.
CPC ............... *B33Y 40/00* (2014.12); *B22F 10/28* (2021.01); *B22F 12/22* (2021.01); *B22F 12/49* (2021.01); *B22F 12/52* (2021.01); *B33Y 10/00* (2014.12)

(56) References Cited

U.S. PATENT DOCUMENTS

| | | | |
|---|---|---|---|
| 5,203,226 A | | 4/1993 | Hongou et al. |
| 5,328,215 A | * | 7/1994 | Grenier ............... F16L 37/0925 285/321 |
| 5,742,385 A | | 4/1998 | Champa |
| 5,990,444 A | | 11/1999 | Costin |
| 6,010,155 A | | 1/2000 | Rinehart |
| 6,096,249 A | | 8/2000 | Yamaguchi |
| 6,140,602 A | | 10/2000 | Costin |
| 6,250,533 B1 | | 6/2001 | Otterbein et al. |
| 6,252,196 B1 | | 6/2001 | Costin et al. |
| 6,318,642 B1 | | 11/2001 | Goenka et al. |
| 6,357,802 B1 | * | 3/2002 | Nozato ............... F16L 37/091 264/269 |
| 6,365,057 B1 | | 4/2002 | Whitehurst et al. |
| 6,391,251 B1 | | 5/2002 | Keicher et al. |
| 6,409,930 B1 | | 6/2002 | Whitehurst et al. |
| 6,468,439 B1 | | 10/2002 | Whitehurst et al. |
| 6,554,345 B2 | | 4/2003 | Jonsson |
| 6,585,151 B1 | | 7/2003 | Ghosh |
| 6,644,721 B1 | | 11/2003 | Miskech et al. |
| 6,811,744 B2 | | 11/2004 | Keicher et al. |
| 6,866,497 B2 | | 3/2005 | Saiki |
| 6,919,035 B1 | | 7/2005 | Clough |
| 6,926,970 B2 | | 8/2005 | James et al. |
| 7,067,032 B1 | * | 6/2006 | Bremont ............... F16L 47/02 285/915 |
| 7,152,292 B2 | | 12/2006 | Hohmann et al. |
| 7,344,186 B1 | | 3/2008 | Hausler et al. |
| 7,500,373 B2 | | 3/2009 | Quell |
| 7,586,062 B2 | | 9/2009 | Heberer |
| 7,637,134 B2 | | 12/2009 | Burzlaff et al. |
| 7,710,347 B2 | | 5/2010 | Gentilman et al. |
| 7,716,802 B2 | | 5/2010 | Stern et al. |
| 7,745,293 B2 | | 6/2010 | Yamazaki et al. |
| 7,766,123 B2 | | 8/2010 | Sakurai et al. |
| 7,852,388 B2 | | 12/2010 | Shimizu et al. |
| 7,908,922 B2 | | 3/2011 | Zarabadi et al. |
| 7,951,324 B2 | | 5/2011 | Naruse et al. |
| 8,094,036 B2 | | 1/2012 | Heberer |
| 8,163,077 B2 | | 4/2012 | Eron et al. |
| 8,286,236 B2 | | 10/2012 | Jung et al. |
| 8,289,352 B2 | | 10/2012 | Vartanian et al. |
| 8,297,096 B2 | | 10/2012 | Mizumura et al. |
| 8,354,170 B1 | | 1/2013 | Henry et al. |
| 8,383,028 B2 | | 2/2013 | Lyons |
| 8,408,036 B2 | | 4/2013 | Reith et al. |
| 8,429,754 B2 | | 4/2013 | Jung et al. |
| 8,437,513 B1 | | 5/2013 | Derakhshani et al. |
| 8,444,903 B2 | | 5/2013 | Lyons et al. |
| 8,452,073 B2 | | 5/2013 | Taminger et al. |
| 8,599,301 B2 | | 12/2013 | Dowski, Jr. et al. |
| 8,606,540 B2 | | 12/2013 | Haisty et al. |
| 8,610,761 B2 | | 12/2013 | Haisty et al. |
| 8,631,996 B2 | | 1/2014 | Quell et al. |
| 8,675,925 B2 | | 3/2014 | Derakhshani et al. |
| 8,678,060 B2 | | 3/2014 | Dietz et al. |
| 8,686,314 B2 | | 4/2014 | Schneegans et al. |
| 8,686,997 B2 | | 4/2014 | Radet et al. |
| 8,694,284 B2 | | 4/2014 | Berard |
| 8,720,876 B2 | | 5/2014 | Reith et al. |
| 8,752,166 B2 | | 6/2014 | Jung et al. |
| 8,755,923 B2 | | 6/2014 | Farahani et al. |
| 8,787,628 B1 | | 7/2014 | Derakhshani et al. |
| 8,818,771 B2 | | 8/2014 | Gielis et al. |
| 8,870,236 B2 | * | 10/2014 | Rule ............... F16L 21/03 285/321 |
| 8,873,238 B2 | | 10/2014 | Wilkins |
| 8,978,535 B2 | | 3/2015 | Ortiz et al. |
| 9,006,605 B2 | | 4/2015 | Schneegans et al. |
| 9,071,436 B2 | | 6/2015 | Jung et al. |
| 9,101,979 B2 | | 8/2015 | Hofmann et al. |
| 9,104,921 B2 | | 8/2015 | Derakhshani et al. |
| 9,126,365 B1 | | 9/2015 | Mark et al. |
| 9,128,476 B2 | | 9/2015 | Jung et al. |
| 9,138,924 B2 | | 9/2015 | Yen |
| 9,149,988 B2 | | 10/2015 | Mark et al. |
| 9,156,205 B2 | | 10/2015 | Mark et al. |
| 9,186,848 B2 | | 11/2015 | Mark et al. |
| 9,244,986 B2 | | 1/2016 | Karmarkar |
| 9,248,611 B2 | | 2/2016 | Divine et al. |
| 9,254,535 B2 | | 2/2016 | Buller et al. |
| 9,266,566 B2 | | 2/2016 | Kim |
| 9,269,022 B2 | | 2/2016 | Rhoads et al. |
| 9,327,452 B2 | | 5/2016 | Mark et al. |
| 9,329,020 B1 | | 5/2016 | Napoletano |
| 9,332,251 B2 | | 5/2016 | Haisty et al. |
| 9,346,127 B2 | | 5/2016 | Buller et al. |
| 9,389,315 B2 | | 7/2016 | Bruder et al. |
| 9,399,256 B2 | | 7/2016 | Buller et al. |
| 9,403,235 B2 | | 8/2016 | Buller et al. |
| 9,418,193 B2 | | 8/2016 | Dowski, Jr. et al. |
| 9,457,514 B2 | | 10/2016 | Schwärzler |
| 9,469,057 B2 | | 10/2016 | Johnson et al. |
| 9,478,063 B2 | | 10/2016 | Rhoads et al. |
| 9,481,402 B1 | | 11/2016 | Muto et al. |
| 9,486,878 B2 | | 11/2016 | Buller et al. |
| 9,486,960 B2 | | 11/2016 | Paschkewitz et al. |
| 9,502,993 B2 | | 11/2016 | Deng |
| 9,525,262 B2 | | 12/2016 | Stuart et al. |
| 9,533,526 B1 | | 1/2017 | Nevins |
| 9,555,315 B2 | | 1/2017 | Aders |
| 9,555,580 B1 | | 1/2017 | Dykstra et al. |
| 9,557,856 B2 | | 1/2017 | Send et al. |
| 9,566,742 B2 | | 2/2017 | Keating et al. |
| 9,566,758 B2 | | 2/2017 | Cheung et al. |
| 9,573,193 B2 | | 2/2017 | Buller et al. |
| 9,573,225 B2 | | 2/2017 | Buller et al. |
| 9,586,290 B2 | | 3/2017 | Buller et al. |
| 9,595,795 B2 | | 3/2017 | Lane et al. |
| 9,597,843 B2 | | 3/2017 | Stauffer et al. |
| 9,600,929 B1 | | 3/2017 | Young et al. |
| 9,609,755 B2 | | 3/2017 | Coull et al. |
| 9,610,737 B2 | | 4/2017 | Johnson et al. |
| 9,611,667 B2 | | 4/2017 | GangaRao et al. |
| 9,616,623 B2 | | 4/2017 | Johnson et al. |
| 9,626,487 B2 | | 4/2017 | Jung et al. |
| 9,626,489 B2 | | 4/2017 | Nilsson |
| 9,643,361 B2 | | 5/2017 | Liu |
| 9,662,840 B1 | | 5/2017 | Buller et al. |
| 9,665,182 B2 | | 5/2017 | Send et al. |
| 9,672,389 B1 | | 6/2017 | Mosterman et al. |
| 9,672,550 B2 | | 6/2017 | Apsley et al. |
| 9,676,145 B2 | | 6/2017 | Buller et al. |
| 9,684,919 B2 | | 6/2017 | Apsley et al. |
| 9,688,032 B2 | | 6/2017 | Kia et al. |
| 9,690,286 B2 | | 6/2017 | Hovsepian et al. |
| 9,700,966 B2 | | 7/2017 | Kraft et al. |
| 9,703,896 B2 | | 7/2017 | Zhang et al. |
| 9,713,903 B2 | | 7/2017 | Paschkewitz et al. |
| 9,718,302 B2 | | 8/2017 | Young et al. |
| 9,718,434 B2 | | 8/2017 | Hector, Jr. et al. |
| 9,724,877 B2 | | 8/2017 | Flitsch et al. |
| 9,724,881 B2 | | 8/2017 | Johnson et al. |
| 9,725,178 B2 | | 8/2017 | Wang |
| 9,731,730 B2 | | 8/2017 | Stiles |
| 9,731,773 B2 | | 8/2017 | Gami et al. |
| 9,741,954 B2 | | 8/2017 | Bruder et al. |

(56) References Cited

U.S. PATENT DOCUMENTS

| | | |
|---|---|---|
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |

(56) References Cited

U.S. PATENT DOCUMENTS

| | | | |
|---|---|---|---|
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2002/0014771 A1* | 2/2002 | Gotoh .................. F16L 13/103 285/371 |
| 2005/0212297 A1* | 9/2005 | McPherson ......... B29C 66/5221 285/915 |
| 2006/0108783 A1 | 5/2006 | Ni et al. |
| 2006/0243382 A1* | 11/2006 | Kilwin .............. B29C 66/43441 156/285 |
| 2014/0277669 A1 | 9/2014 | Nardi et al. |
| 2016/0016229 A1* | 1/2016 | Czinger ................. B22F 10/00 296/205 |
| 2017/0050677 A1* | 2/2017 | Czinger ............... B62D 29/048 |
| 2017/0113344 A1 | 4/2017 | Schönberg |
| 2017/0341309 A1 | 11/2017 | Piepenbrock et al. |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

* cited by examiner

SINGLE SHEAR JOINT FOR NODE-TO-NODE CONNECTIONS

CROSS-REFERENCE TO RELATED APPLICATION

This Application is a continuation of, and claims the benefit of, U.S. patent application Ser. No. 15/924,133, filed Mar. 16, 2018, entitled "Single Shear Joint For Node-To-Node Connections", pending, the contents of which are incorporated by reference as if fully set forth herein.

BACKGROUND

Field

The present disclosure relates generally to apparatus and techniques in manufacturing, and more specifically to node-to-node connections that may be for use in producing vehicles, boats, aircraft and other mechanical structures.

Background

3-D printing, which may also be referred to as additive manufacturing, is a process used to create 3-D objects. The 3-D objects may be formed using layers of material based on digital model data of the object. A 3-D printer may form the layers of material using the digital model data to print one layer at a time. 3-D printed objects may be almost any shape or geometry.

A 3-D printer may disseminate a powder layer (e.g., powdered metal) on an operating surface. The powder layer may be approximately 100 microns thick. The 3-D printer may then bond particular areas of the powder layer into a layer of the object, e.g., by using a laser to bond the powder of the powder layer together. The steps may be repeated to sequentially form each layer. Accordingly, the 3-D printed object may be built layer by layer to form the 3-D object.

3-D printed components may be used to produce sub-components for various devices or apparatus. The 3-D printed sub-components may need to be attached or connected to other sub-components, including other 3-D printed sub-components, extruded sub-components, or still other sub-components.

Nodes may be manufactured using 3-D printing or other manufacturing techniques. The nodes may need to be attached together to form vehicles, boats, aircraft and other mechanical structures. Accordingly, node-to-node connection techniques may be used to attach nodes together.

SUMMARY

Several aspects of node-to-node single shear connections will be described more fully hereinafter with reference to three-dimensional printing techniques.

One aspect is an apparatus including a first node including a first bonding surface and a second node including a second bonding surface. The apparatus also includes a feature configured to accept an adhesive and an adhesive channel coupled to the feature configured to accept the adhesive. The apparatus also includes a shear joint coupling the first node and the second node. The shear joint is configured to receive the adhesive in an adhesive region formed by the first bonding surface and the second bonding surface. Additionally, the adhesive couples the first bonding surface to the second bonding surface through the feature that is configured to accept the adhesive.

One aspect is a method of manufacturing. The method includes additively manufacturing a first node having a first bonding surface and a second node having a second bonding surface. The method also includes fixturing the first node and the second node for adhesive injection. The method includes drawing vacuum to evacuate a bonding region. The method also includes injecting adhesive through a feature configured to accept an adhesive to fill a bonding region. The bonding region is formed by a bonding surface of the first node and a bonding surface of the second node. Additionally, the adhesive couples the first bonding surface to the second bonding surface.

One aspect is an apparatus including means for additively manufacturing a first node having a first bonding surface and a second node having a second bonding surface. The apparatus also includes means for fixturing the first node and the second node for adhesive injection. The apparatus includes means for drawing vacuum to evacuate an adhesive channel. The apparatus also includes means for injecting adhesive through a feature configured to accept an adhesive to fill a bonding region, the bonding region formed by a bonding surface of the first node and a bonding surface of the second node. The adhesive couples the first bonding surface to the second bonding surface.

It will be understood that other aspects of 3-D printed components and related fasteners will become readily apparent to those skilled in the art from the following detailed description, wherein it is shown and described only several embodiments by way of illustration. As will be realized by those skilled in the art, the 3-D printed components and related fasteners are capable of other and different embodiments, and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of 3-D printed components and related fasteners will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of 3-D printed components and related fasteners and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of 3-D printing in the context of composite tooling provides significant flexibility for enabling manufacturers of mechanical structures and mechanized assemblies to manufacture parts with complex geometries. For example, 3-D printing techniques provide manufacturers with the flexibility to design and build parts having intricate internal lattice structures and/or profiles that are not possible to manufacture via traditional manufacturing processes.

FIGS. 1A-D illustrate respective side views of an exemplary 3-D printer system. In this example, the 3-D printer system is a powder-bed fusion (PBF) system 100. FIGS. 1A-D show PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as build piece 109. PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Figure 1A:
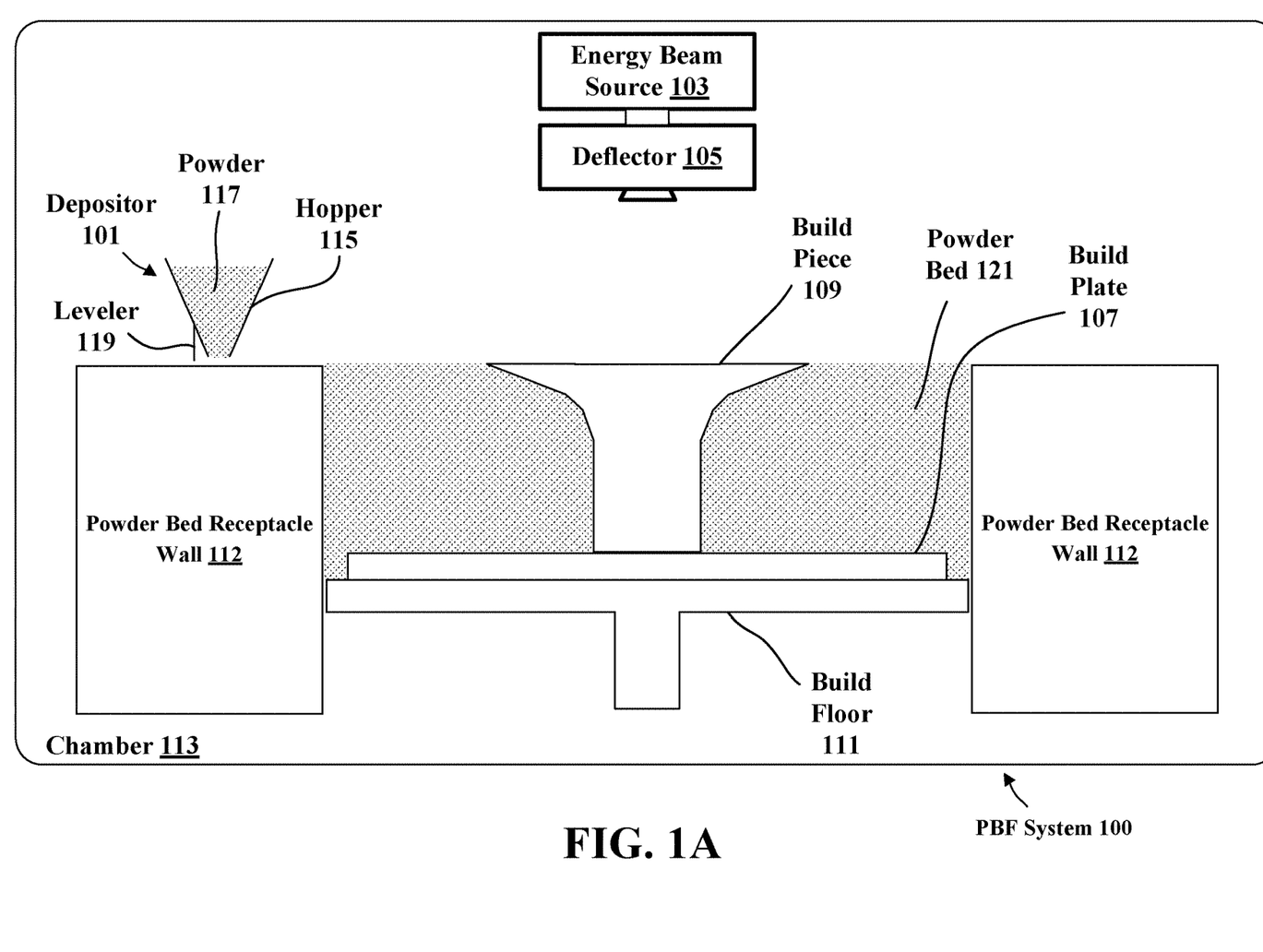
FIGS. 1A-D illustrate an example 3-D printer system during different stages of operation.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
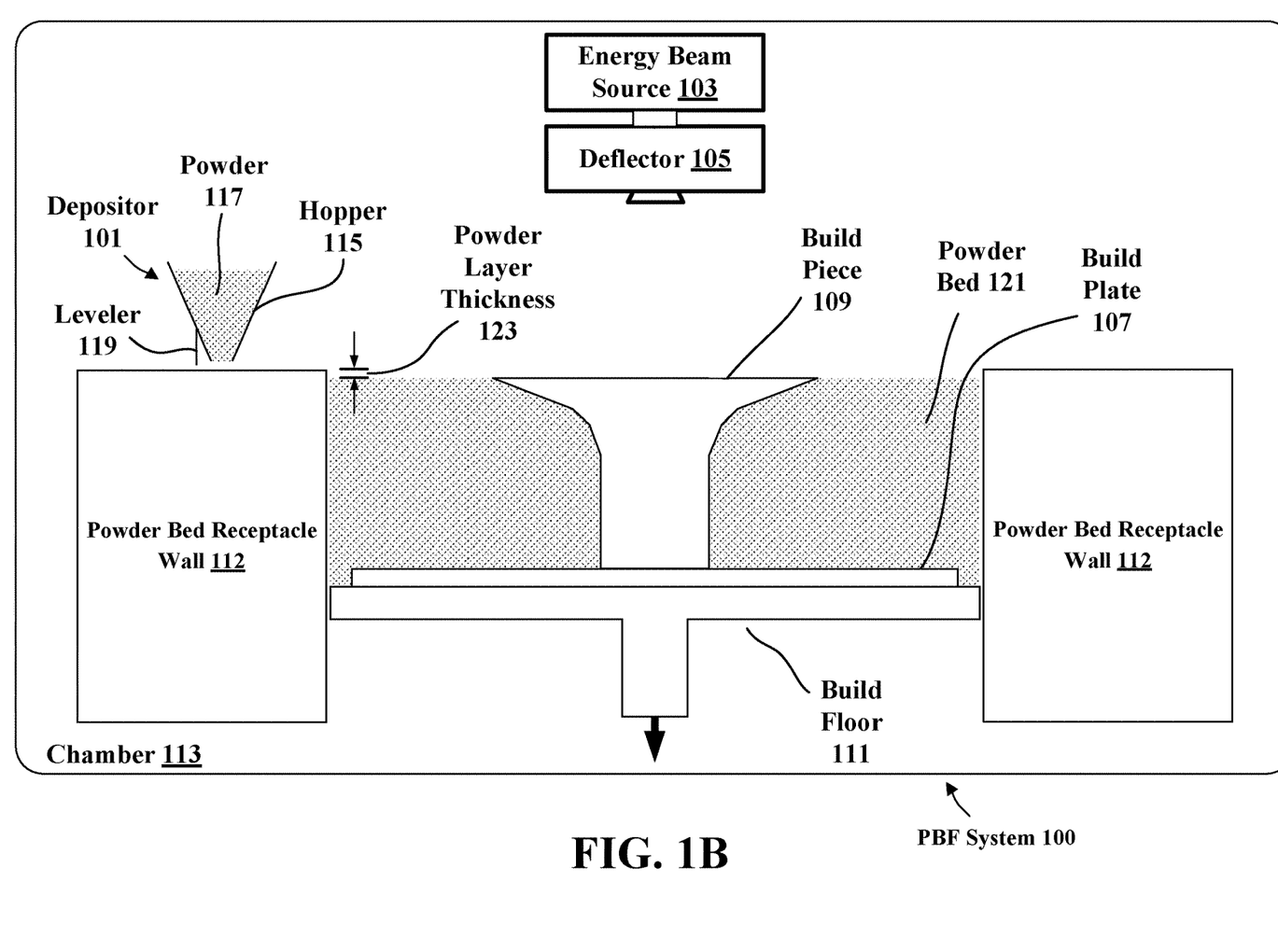

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
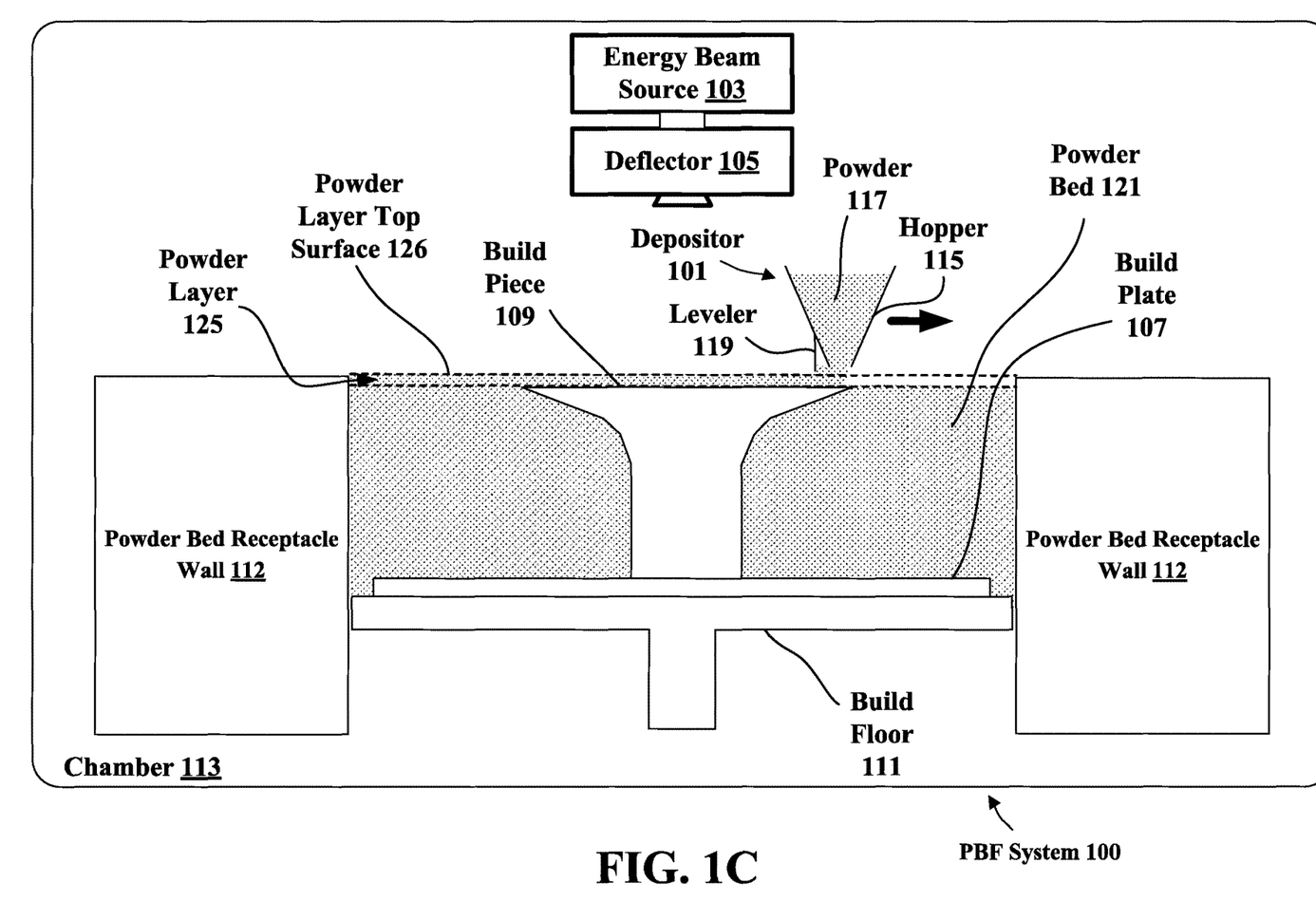

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving 150 previously-deposited layers discussed above with reference to FIG. 1A.

Figure 1D:
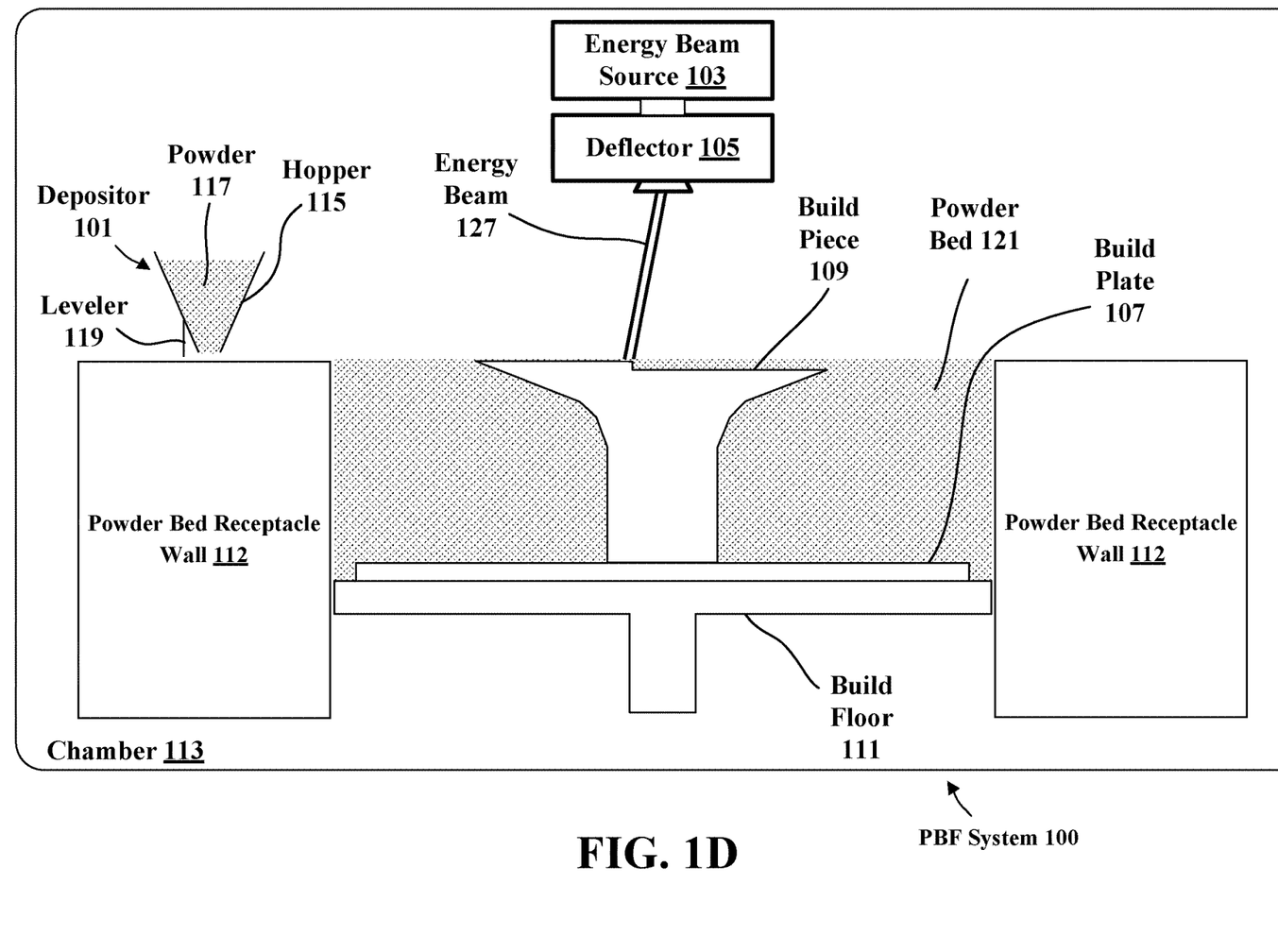

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 2:
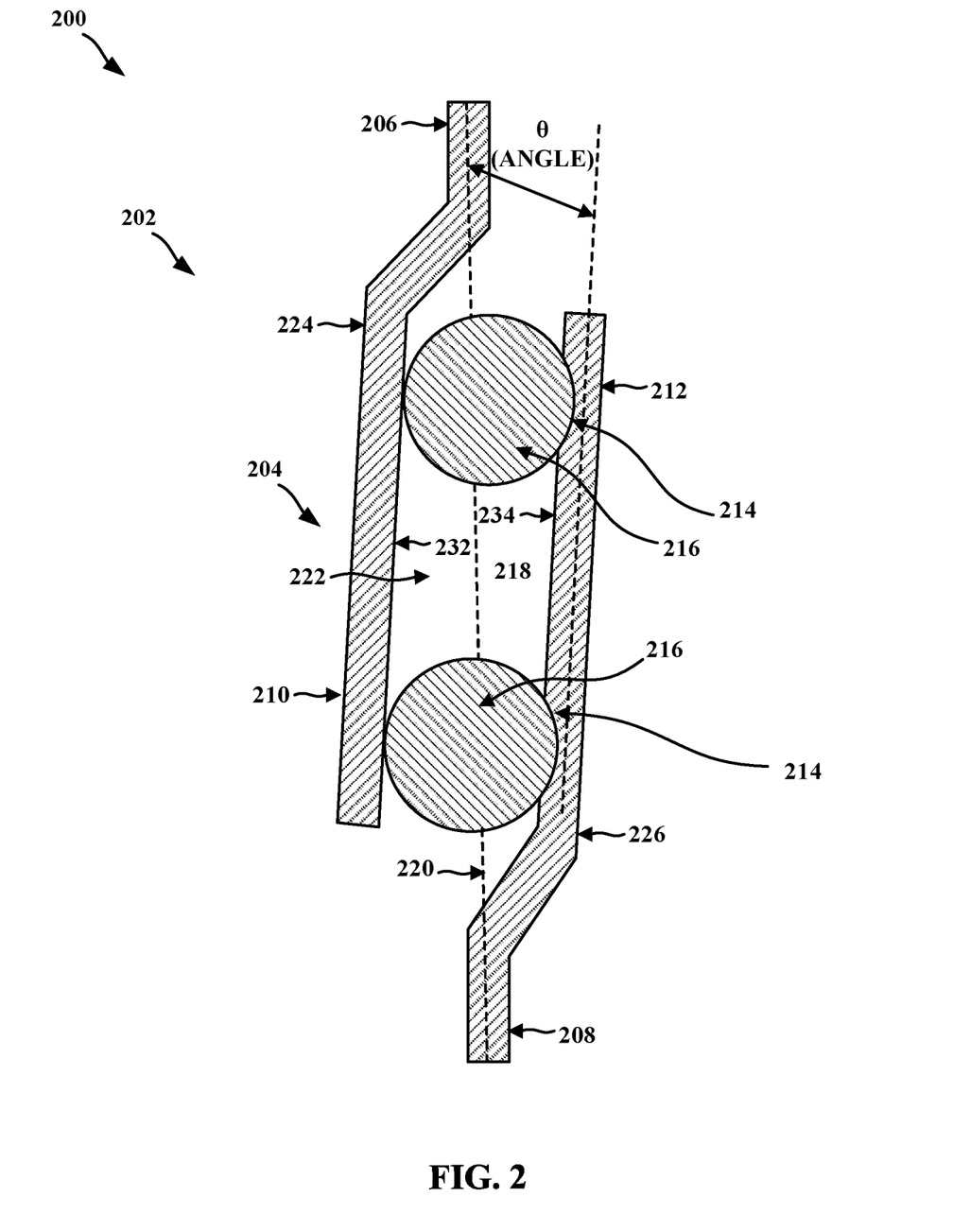
FIG. 2 is a diagram illustrating an example connection feature.

FIG. 2 is a diagram illustrating an example connection feature 200. The example connection feature 200 may be a node-to-node connection 202. The node-to-node connection 202 may be realized by a joint 204 including a single shear adhesive bond 222. The joint 204 including the single shear adhesive bond 222 may be a joining technique between additively manufactured nodes (e.g., first node 206, second node 208). The nodes 206, 208 may be fabricated with substantially flat features 210, 212 to facilitate adhesive bonding therebetween to form the connection (e.g., the single shear joint 204).

The basic steps to form the joint may be to additively manufacturing the two nodes 206, 208 with bonding features 224, 226 (e.g., of bond joint 204). Adhesive inlet ports and adhesive outlet ports (not shown) may be on either one or both of the nodes 206, 208. The adhesive and vacuum ports may be cylindrical connection points for adhesive and/or vacuum tubes. Adhesive may be injected through the inlet port, and the adhesive may flow into adhesive regions and flows out of the adhesive outlet port. An aspect may rely on the pressure of the adhesive injection. In another aspect, the adhesive outlet port may be connected to a vacuum port. The nodes 206, 208 may include sealing features 214. For example, the sealing feature 214 may be in one of the nodes 208.

The basic steps to form the joint may include applying the seals 216 (e.g., o-rings or other mechanical seals) to the sealing features 214 and fixturing the nodes 206, 208 for adhesive injection. The basic steps to form the joint may also include drawing a vacuum to evacuate a bonding region 218 to obtain a sealed section. Additionally, the basic steps to form the joint may include injecting adhesive through the adhesive port to fill the bonding region 218. The basic steps to form the joint may also include letting the adhesive cure to obtain the connection. The bonding region 218 may be formed by a bonding surface 232 of the first node 206 and a bonding surface 234 of the second node 208. The adhesive may be used for coupling the first bonding surface 232 to the second bonding surface 234.

The example of FIG. 2 illustrates a cross-section of an example joint 204 including a single shear adhesive bond 222. In the cross-section, the first node 206 and the second node 208 may include bonding features 224, 226 (e.g., of bond joint 204). The bonding features 224, 226 (e.g., the substantially flat features 210, 212 of the bonding joint 204) may be parallel to each other. The substantially flat features 210, 212 may be oriented to the load path by a certain angle to enable initial fitment of the two nodes prior to the application of adhesive. In an aspect, the angle may be 1 degree. In an aspect, the angle may be less than 1 degree. In an aspect, the angle may be between 1 and 2 degrees. In an aspect, the angle may be between 2 and 3 degrees. In an aspect, the angle may be between 3 and 4 degrees. In an aspect, the angle may be between 5 and 6 degrees. In an aspect, the angle may be between 6 and 7 degrees. In an aspect, the angle may be between 7 and 8 degrees. In an aspect, the angle may be between 8 and 9 degrees. In an aspect, the angle may be between 9 and 10 degrees. In an aspect, the angle may be between 1 and 10 degrees.

In an aspect, a slight angled (e.g., at angle θ) orientation may be designed in such a way that section of the adhesive bond 222 remains substantially parallel with the load path 220 to produce a connection with suitable mechanical properties.

Figure 3:
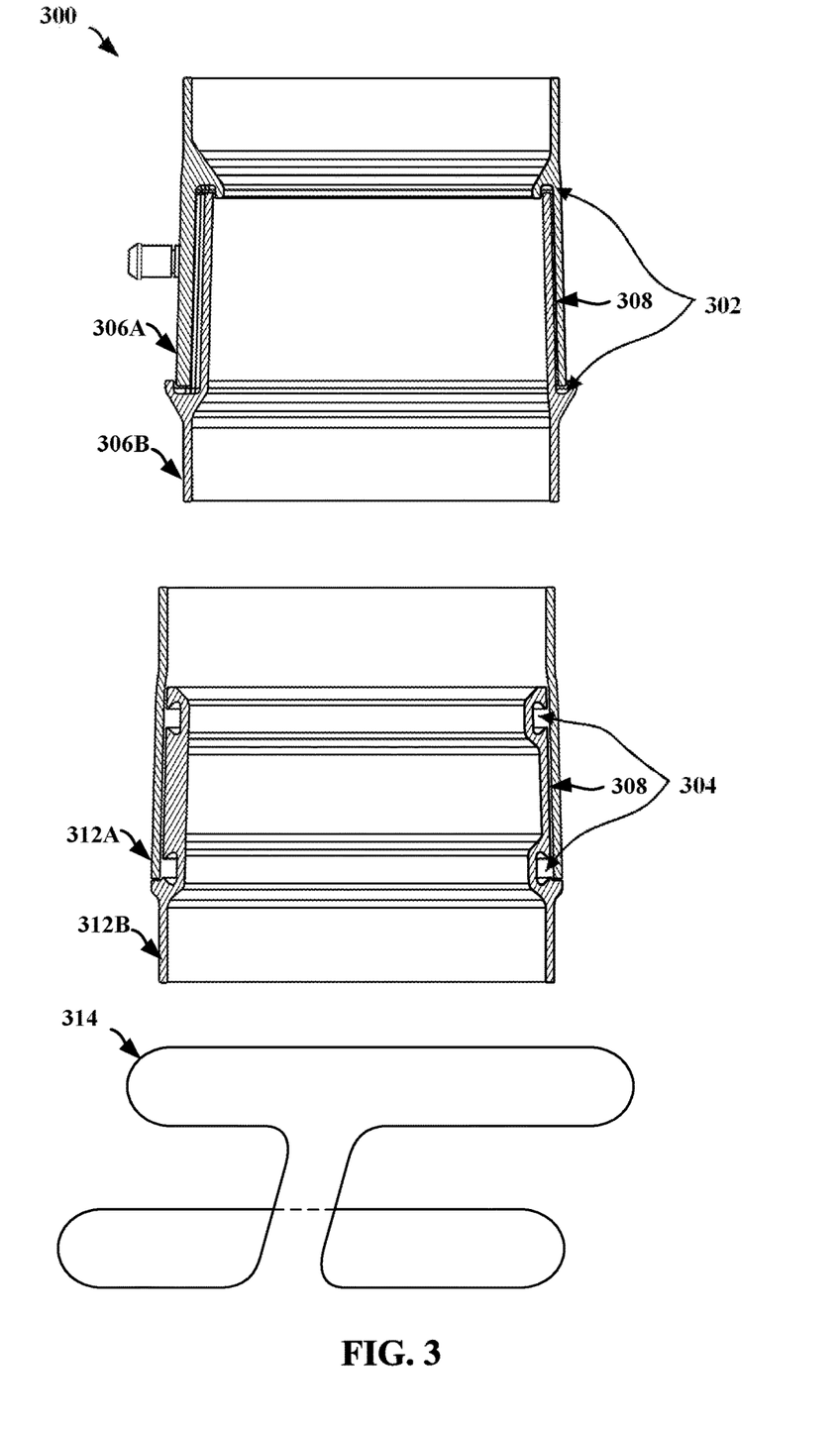
FIG. 3 is a diagram illustrating example features to accept sealants.

FIG. 3 is a diagram 300 illustrating examples of features 302, 304 configured to accept sealants. The features 302 may be formed by a pair of nodes 306A, 306B. In another aspect, the features 304 configured to accept sealants may be present on one of the nodes 312B. The features 302, in one aspect, may be grooves in which O-Rings may be fitted. The O-Ring (see example O-ring profile 314) may form a loop around the surface of the second node 312B, e.g., within the grooves. In an aspect, one O-ring may be bent across four phases or sides of the node. The O-ring may be configured to form a bridge between two parts of the node. The bridge may allow adhesive to flow from one part of the node to another part of the node, e.g., between portions of the O-ring. For example, portions of the O-ring may seal around a node, while leaving a gap between the O-ring portions that may act as a bridge. The region 308 bound by the O-Ring may be an adhesive bond region between the two nodes 312A, 312B. The seal may provide a hermetically sealed environment (e.g., within adhesive bond region 310) for adhesive to be drawn into to realize the bond. Additionally, the seals (e.g., adhesive and/or O-ring) may serve as isolators to prevent physical contact of the two nodes 306A, 306B or the nodes 312A, 312B being joined, thereby reducing or eliminating the possibility of galvanic corrosion.

A design consideration while designing O-Ring based seals may be to include bridging. As adhesive is drawn into the sealed section through the adhesive port, the adhesive may fill the sealed section and be drawn by the vacuum (e.g., drawn by a negative pressure source connected to a vacuum port). Bridges may ensure that the adhesive completely fills the sealed section (e.g., within adhesive bond region 310) and the fill process may continue in a smooth, stable manner.

In an aspect, a vacuum port and an adhesive port may be located on either one of the nodes 306, 312. Additively manufacturing the nodes 306, 312 may provide the ability to design ports and internal channels for the adhesive and vacuum to be filled (or drawn) through the channels to first evacuate the sealed chamber, and then to introduce adhesive into the chamber. These ports may be referred to as vacuum ports and/or vacuum ports. In some aspects, these vacuum ports and/or vacuum ports may be protrusions or recesses. Adhesive may be injected through the inlet port, and the adhesive may flow into adhesive regions and flows out of the adhesive outlet port. An aspect may rely on the pressure of the adhesive injection. In another aspect, the adhesive outlet port may be connected to a vacuum port.

Figure 4:
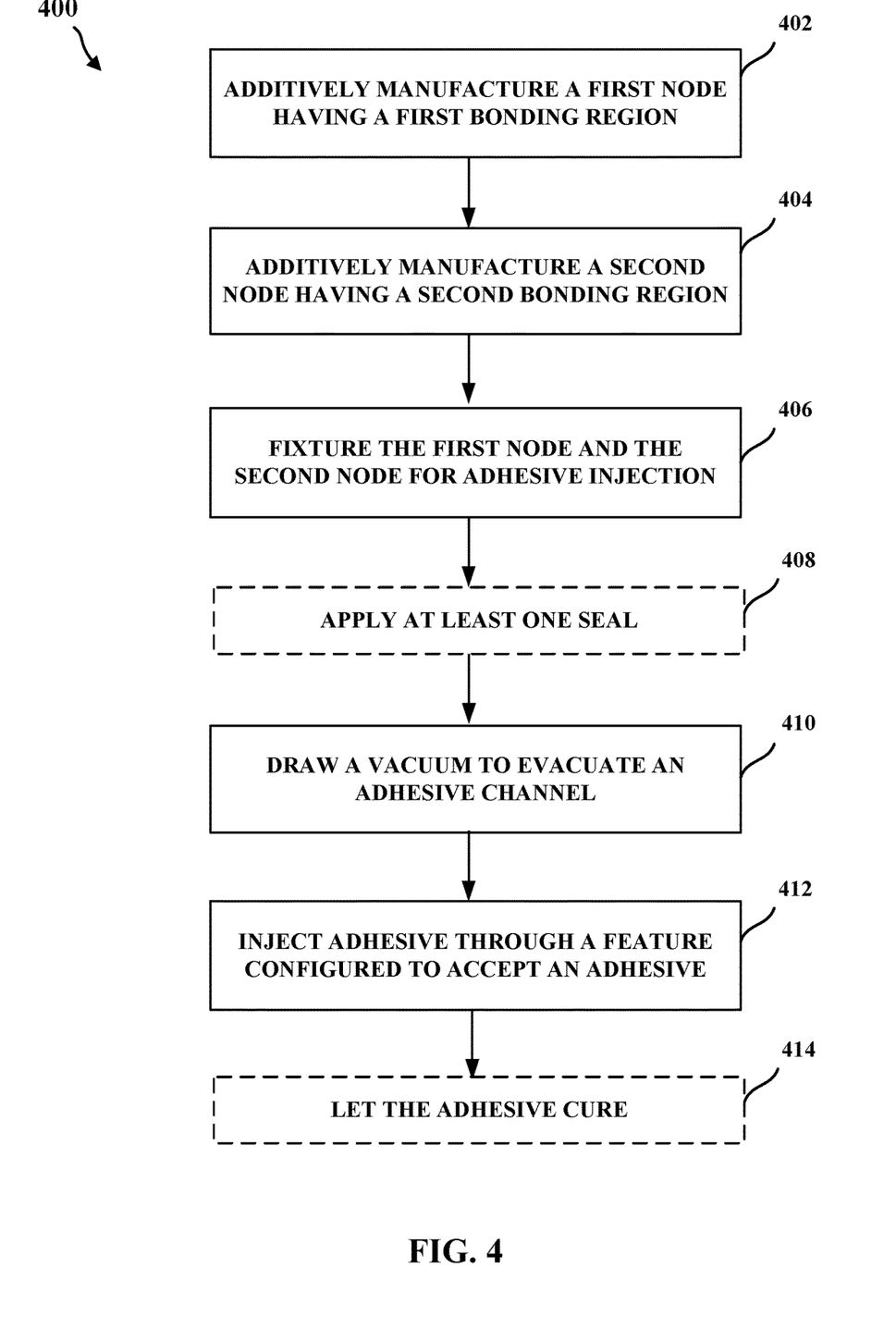
FIG. 4 is a flowchart illustrating an example method in accordance with the systems and methods described herein.

FIG. 4 is a flowchart illustrating an example method in accordance with the systems and methods described herein. At 402, an apparatus implementing the method may manufacture a first node. The first node may have a first bonding surface. For example, an apparatus implementing the method may additively manufacture the first node 206. The first node 206 may have a first bonding surface 232. In an aspect, the apparatus 500 discussed with respect to FIG. 5, below, may be configured to cause the PBF system 100 discussed with respect to FIGS. 1A-1D to additively manufacture a first node 206 having a first bonding surface 232.

At 404, an apparatus implementing the method may manufacture a second node having a second bonding surface. For example, an apparatus implementing the method may additively manufacture the second node 208 having the second bonding surface 234. In an aspect, the apparatus 500 discussed with respect to FIG. 5 may be configured to cause the PBF system 100 discussed with respect to FIGS. 1A-1D to additively manufacture a second node 208 having a second bonding surface 234.

At 406, an apparatus implementing the method may fixture the first node and the second node for adhesive injection. For example, an apparatus implementing the method may fixture the first node 206 for adhesive injection. The apparatus implementing the method may also fixture the second node 208 for adhesive injection. In an aspect, the assembly apparatus 500 discussed with respect to FIG. 5 may be configured to cause an assembly apparatus to fixture the first node 206 and the second node 208 for adhesive injection.

At 408, an apparatus implementing the method may apply at least one seal. For example, an apparatus implementing the method may apply a plurality of seals. In an aspect, the apparatus 500 discussed with respect to FIG. 5 may be configured to cause an assembly apparatus to apply at least one seal.

At 410, an apparatus implementing the method may draw a vacuum to evacuate an adhesive channel. For example, an apparatus implementing the method may be connected to vacuum lines and may draw a vacuum to evacuate an adhesive channel. In an aspect, the apparatus 500 discussed with respect to FIG. 5 may be configured to cause an assembly apparatus to draw vacuum to evacuate an adhesive channel. For example, the apparatus 500 discussed with respect to FIG. 5 may cause a vacuum pump within an assembly apparatus to draw vacuum to evacuate an adhesive channel in a node being manufactured.

At 412, an apparatus implementing the method may inject adhesive through a feature configured to accept an adhesive to fill a bonding region. The bonding region may be formed by a bonding surface of the first node and a bonding surface of the second node. The adhesive may be used for coupling the first bonding surface to the second bonding surface. For example, the apparatus 500 discussed with respect to FIG. 5 may be configured to cause an assembly apparatus to inject adhesive through a feature configured to accept an adhesive to fill an bonding region 218. The bonding region 218 may be formed by a bonding surface 228 of the first node 206 and a bonding surface 230 of the second node 208. The adhesive may be used for coupling the first bonding surface 232 to the second bonding surface 232.

At 414, an apparatus implementing the method may let the adhesive cure. For example, an apparatus implementing the method may pause the manufacturing process or pause the manufacturing process with respect to a component to be cured to let the adhesive cure. In an aspect, the apparatus 500 discussed with respect to FIG. 5 may be configured to cause an assembly apparatus to let the adhesive cure. For example, the apparatus 500 may pause the manufacturing process or pause the manufacturing process with respect to a component to be cured to let the adhesive cure.

Figure 5:
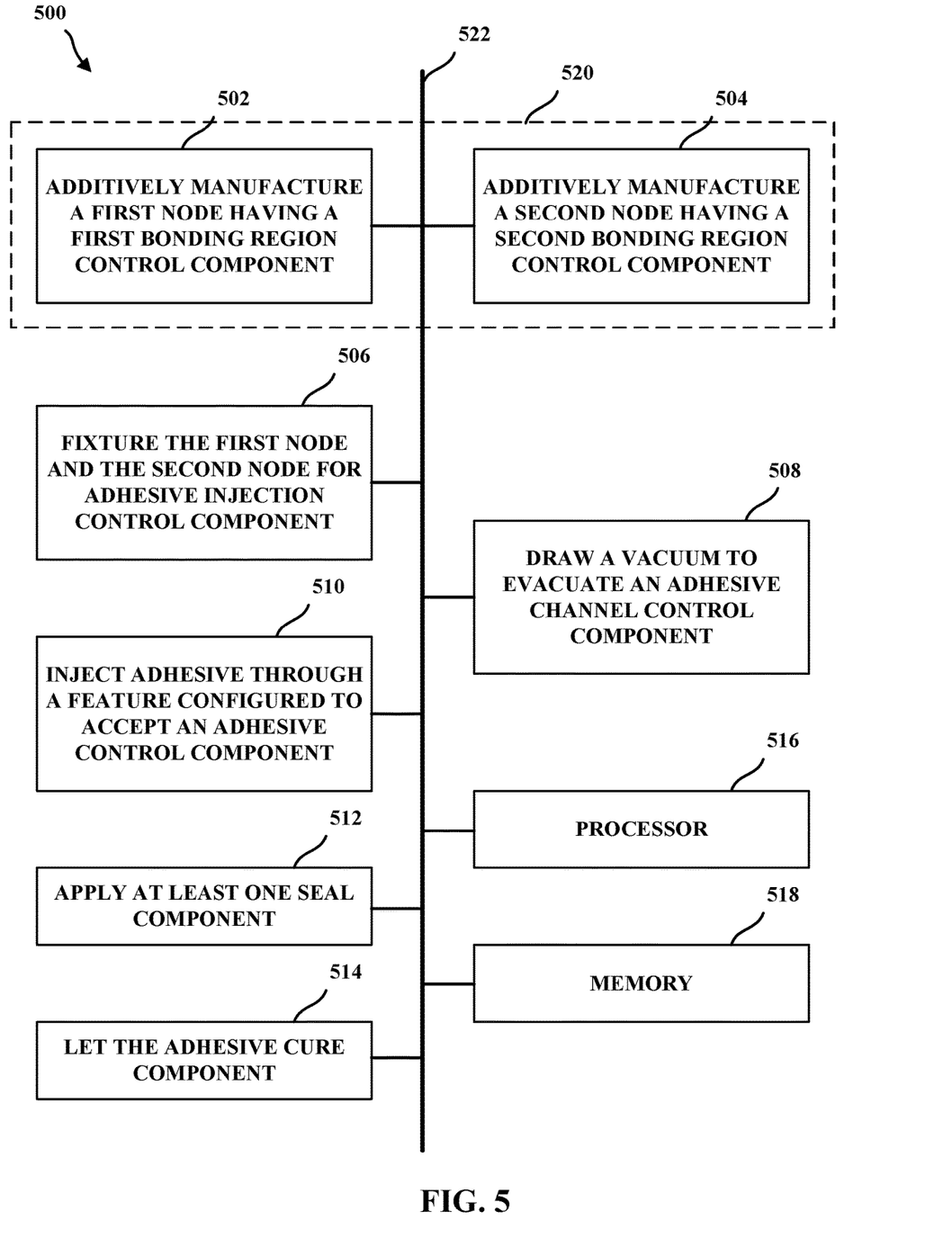
FIG. 5 is a diagram illustrating an example device in accordance with the systems and methods described herein.

The assembly apparatus may be one or more assembly apparatus configured to perform one or more of 506, 508, 510, 512, and/or 514.

FIG. 5 is a diagram illustrating an apparatus 500 that may be configured to implement the systems and methods described herein, e.g., the method implemented in FIG. 4. For example, the apparatus 500 may be a processor 512 based control system that may control the PBF system 100 discussed with respect to FIGS. 1A-1D. The apparatus 500 may include functional blocks that can represent functions implemented by a processor, software, hardware, or a combination thereof (e.g., firmware).

As illustrated, in FIG. 5, (and referring back to FIG. 2) in an aspect, the apparatus 500 may include a component 502 that controls the additively manufacture of a first node having a first bonding surface 232. For example, the component 502 may control the PBF system 100 discussed with respect to FIGS. 1A-1D. In an aspect, the apparatus 500 may include a component 504 that controls the additively manufacture of a second node 208 having a second bonding surface. For example, the component 504 may control the PBF system 100 discussed with respect to FIGS. 1A-1D. The components 502 and 504 may be separate components 502, 504 that may control one or more PBF systems 100. For example, two separate components 502, 504 may generally be used to control two PBF systems 100, i.e., one component 502, 504 for each PBF system 100. The components 502 and 504 may be a single component 520 that may control one or more PBF systems 100. For example, a single component 520 may generally be used to control a single PBF system, i.e., one component 520 for the PBF system 100.

The apparatus 500 may include a component 506 that controls the fixturing of the first node 206 and the second node 208 for adhesive injection. For example, the component 506 may control the PBF system 100 discussed with respect to FIGS. 1A-1D to control fixturing. The apparatus 500 may include a component 508 that controls the draw of a vacuum to evacuate an adhesive channel control. For example, the component 506 may control the PBF system 100 discussed with respect to FIGS. 1A-1D to control drawing a vacuum. The apparatus 500 may include a component 510 that controls the injecting of adhesive through a feature configured to accept an adhesive control. For example, the component 510 may control the PBF system 100 discussed with respect to FIGS. 1A-1D to control the injecting. The apparatus 500 may include a component (e.g., processor 512) that controls applying at least one seal. For example, the component (e.g., processor 512) may control the PBF system 100 discussed with respect to FIGS. 1A-1D to control applying at least one seal. The apparatus 500 may include a component 514 that controls letting the adhesive cure. For example, the component 514 may control the PBF system 100 discussed with respect to FIGS. 1A-1D to control curing.

In related aspects, the apparatus 500 may optionally include a processor component having at least one processor 516. The processor 516 may be in operative communication with the components 502, 504, 506, 508, 510, 512, 514, 520 or similar components via a bus 522 or similar communication coupling. The processor 516 may effect initiation and scheduling of the processes or functions performed by components 502, 504, 506, 508, 510, 512, 514, 520. The processor 516 may encompass the components 502, 504, 506, 508, 510, 512, 514, 520, in whole or in part. In the alternative, the processor 516 may be separate from the components 502, 504, 506, 508, 510, 512, 514, 518, 520, which may include one or more separate processors.

The apparatus 500 may optionally include a component for storing information, such as, for example, a memory device/component 518. The computer readable medium or the memory component 518 may be operatively coupled to the other components of the apparatus 500 via the bus 522 or the like. The memory component 518 may be adapted to store computer readable instructions and data for performing the activity of the components 502, 504, 506, 508, 510, 512, 514, 520, and subcomponents thereof, or the processor 516, or the methods disclosed herein. The memory component 518 may retain instructions for executing functions associated with the components 502, 504, 506, 508, 510, 512, 514, 520. While shown as being external to the memory component 518, it is to be understood that the components 502, 504, 506, 508, 510, 512, 514, 520 can exist within the memory component 518.

The means for additively manufacturing a first node 206 may have a first bonding surface 232 and the means for additively manufacturing a second node 208 having a second bonding surface may be one or more of the PBF system 100 discussed with respect to FIGS. 1A-1D. The means for fixturing the first node 206 and the second node 208 for adhesive injection may include a fixture configured to hold the first node 206 and the second node 208. The means for drawing a vacuum to evacuate an adhesive channel may include a vacuum pump or other pump capable of drawing a vacuum. The means for injecting adhesive through a feature configured to accept an adhesive to fill a bonding region may be an injection pump or some other type of pump capable of injecting adhesive. In an aspect, one or more of the means for fixturing, the means for drawing a vacuum, or the means for injecting adhesive may be incorporated into the PBF system 100 with the means for additively manufacturing a first node 206 having a first bonding surface 232 and the means for additively manufacturing a second node 208 having a second bonding surface.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, such as a custom application-specific integrated circuit (ASIC), and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be implemented in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is for purpose of example, and not for limitation. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. An apparatus, comprising:
   a first node including a first bonding surface;
   a second node including a second bonding surface;
   a feature configured to accept an adhesive;
   an adhesive channel coupled to the feature configured to accept the adhesive; and
   a shear joint coupling the first node and the second node, the shear joint configured to receive the adhesive in an adhesive region formed by the first bonding surface and the second bonding surface, the adhesive for coupling the first bonding surface to the second bonding surface through the feature configured to accept the adhesive; and
   wherein the first bonding surface and the second bonding surface are parallel to each other, and an adhesive bond section remains substantially parallel with a load path.

2. The apparatus of claim 1, wherein the feature configured to accept the adhesive comprises an adhesive inlet and an adhesive outlet.

3. The apparatus of claim 2, wherein the adhesive inlet comprises an adhesive port and the adhesive outlet comprises a vacuum port.

4. The apparatus of claim 2, wherein the adhesive inlet comprises an adhesive port and the adhesive outlet comprises an outlet for the adhesive.

5. The apparatus of claim 3, wherein the vacuum port is located on at least one of the first node or the second node and wherein the adhesive port is located on at least one of the first node or the second node.

6. The apparatus of claim 5, wherein each of the adhesive port and the vacuum port comprise at least one of a protrusion or a recess.

7. The apparatus of claim 1, further comprising the adhesive coupling the first bonding surface to the second bonding surface.

8. The apparatus of claim 1, the shear joint further comprising a sealant feature.

9. The apparatus of claim 8, wherein the sealant feature comprises a first sealant and a second sealant.

10. The apparatus of claim 9, wherein the first sealant and the second sealant are attached to the first node.

11. The apparatus of claim 9, wherein the first sealant is attached to the first node and the second sealant is attached to the second node.

12. The apparatus of claim 8, wherein the sealant comprises a mechanical sealant feature.

13. The apparatus of claim 12, wherein the mechanical sealant feature comprises an O-ring.

14. The apparatus of claim 13, wherein features configured to accept the sealant comprise grooves configured to accept the O-ring.

15. The apparatus of claim 8, wherein the sealant provides a hermetically sealed environment for the adhesive, the sealant providing an isolation between the first node and the second node to prevent physical contact of the first node and the second node.

16. The apparatus of claim 1, wherein the first bonding surface and the second bonding surface are oriented to a load path by an angle.

17. The apparatus of claim 1, further comprising a sealant feature in the first bonding surface or in the second bonding surface.

18. The apparatus of claim 17, further comprising a seal within the sealant feature.

19. The apparatus of claim 17, wherein the sealant feature comprising a first feature and a second feature, wherein the first feature and the second feature are in the first bonding surface, and wherein a first seal is within the first feature and a second seal is within the second feature.

20. The apparatus of claim 19, wherein the first node comprising a first bonding feature adjacent the first seal, and wherein the second node comprising a second bonding feature the adjacent the second seal.

21. The apparatus of claim 20, wherein the first bonding feature and the first bonding surface form a first angle, and the second bonding feature and the second bonding surface form a second angle such that at least a section of the shear joint remains parallel with a load path.

\* \* \* \* \*